United States Patent
Tan et al.

(10) Patent No.: US 10,731,631 B2
(45) Date of Patent: Aug. 4, 2020

(54) WIND POWER GENERATION SYSTEM AND CONTROLLING METHOD THEREOF

(71) Applicant: General Electric Company, Schenectady, NY (US)

(72) Inventors: Zhuohui Tan, Shanghai (CN); Yang Liu, Shanghai (CN); Wenguang Pan, Shanghai (CN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/256,189

(22) Filed: Jan. 24, 2019

(65) Prior Publication Data
US 2019/0234378 A1    Aug. 1, 2019

(30) Foreign Application Priority Data
Jan. 26, 2018  (CN) .......................... 2018 1 0076827

(51) Int. Cl.
| | |
|---|---|
| F03D 7/04 | (2006.01) |
| F03D 9/25 | (2016.01) |
| H02J 3/50 | (2006.01) |
| H02J 3/38 | (2006.01) |
| H02P 9/30 | (2006.01) |
| H02P 101/15 | (2016.01) |

(52) U.S. Cl.
CPC .......... *F03D 7/042* (2013.01); *F03D 9/255* (2017.02); *H02J 3/386* (2013.01); *H02J 3/50* (2013.01); *H02P 9/305* (2013.01); *F05B 2270/327* (2013.01); *H02P 2101/15* (2015.01)

(58) Field of Classification Search
CPC ................................ F03D 7/042; F03D 9/255
USPC ...................................................... 290/44, 55
See application file for complete search history.

(56) References Cited

U.S. PATENT DOCUMENTS

| | | | | |
|---|---|---|---|---|
| 6,137,187 A | * | 10/2000 | Mikhail | ................ F03D 7/0224 |
| | | | | 290/44 |
| 6,420,795 B1 | * | 7/2002 | Mikhail | .................. H02P 9/007 |
| | | | | 290/44 |
| 6,566,764 B2 | * | 5/2003 | Rebsdorf | ................ H02P 9/007 |
| | | | | 290/44 |

(Continued)

FOREIGN PATENT DOCUMENTS

EP        3 187 727 A2    7/2017

OTHER PUBLICATIONS

EP Search Report, dated Jun. 14, 2019.

*Primary Examiner* — Pedro J Cuevas
(74) *Attorney, Agent, or Firm* — Dority & Manning, P.A.

(57) ABSTRACT

The present disclosure provides a wind power generation system, which comprises a wind turbine for generating mechanical energy; a generator for converting the mechanical energy into electrical energy; a converter for converting the electrical energy to expected power for supplying to a grid, wherein a rotor of the generator is connected to converter, an output of a stator of the generator and an output of a converter are both connected to the grid; a controller for controlling the converter to absorb rotor-side reactive power $Q_{rotor}$ and to increase line-side reactive power $Q_{line}$, so as to meet a reactive power demand of the grid, when a rotor speed is less than a predetermined value.

17 Claims, 5 Drawing Sheets

(56) References Cited

U.S. PATENT DOCUMENTS

| | | | |
|---|---|---|---|
| 6,856,038 B2* | 2/2005 | Rebsdorf | H02P 9/007 290/44 |
| 6,856,040 B2* | 2/2005 | Feddersen | F03D 7/0224 290/44 |
| 6,933,625 B2* | 8/2005 | Feddersen | F03D 7/0224 290/44 |
| 7,015,595 B2* | 3/2006 | Feddersen | F03D 7/0224 290/44 |
| 7,253,537 B2* | 8/2007 | Weng | H02P 9/006 290/44 |
| 7,291,937 B2* | 11/2007 | Willisch | H02P 9/007 290/44 |
| 7,423,412 B2* | 9/2008 | Weng | H02P 9/007 322/20 |
| 7,518,256 B2* | 4/2009 | Juanarena Saragueta | H02P 6/005 290/44 |
| 7,939,954 B2* | 5/2011 | Ruiz Flores | H02P 9/102 290/44 |
| 7,948,102 B2* | 5/2011 | Schubert | H02P 9/007 290/44 |
| 7,977,925 B2* | 7/2011 | Larsen | H02P 9/08 290/52 |
| 8,039,979 B2* | 10/2011 | Yasugi | H02P 9/007 290/44 |
| 8,093,741 B2* | 1/2012 | Ritter | H02P 3/22 290/44 |
| 8,198,742 B2* | 6/2012 | Jorgensen | F03D 7/0224 290/44 |
| 8,222,758 B2* | 7/2012 | Arinaga | H02J 3/48 290/44 |
| 8,355,824 B2* | 1/2013 | Yasugi | F03D 7/0284 290/44 |
| 8,390,139 B2* | 3/2013 | Fortmann | H02J 3/18 290/44 |
| 8,400,003 B2* | 3/2013 | Letas | H02J 3/18 290/44 |
| 8,536,722 B1* | 9/2013 | Wakasa | F03D 9/28 290/44 |
| 8,593,114 B2* | 11/2013 | Park | H02P 9/007 322/24 |
| 8,664,788 B1* | 3/2014 | Wagoner | F03D 7/0244 290/44 |
| 8,692,399 B2* | 4/2014 | Schubert | H02P 9/007 290/44 |
| 8,907,510 B2* | 12/2014 | Wagoner | H02P 9/007 290/44 |
| 8,934,270 B2* | 1/2015 | Letas | H02J 3/1892 290/44 |
| 9,157,415 B1* | 10/2015 | Seymour | F03D 7/00 |
| 9,356,533 B2* | 5/2016 | Permuy | H02M 5/40 |
| 9,447,772 B2* | 9/2016 | Edenfeld | F03D 9/25 |
| 9,461,572 B2* | 10/2016 | Wessels | H02J 3/1885 |
| 9,537,437 B2* | 1/2017 | Wagoner | H02P 9/007 |
| 9,587,626 B2* | 3/2017 | Sadaba | F03D 7/0272 |
| 9,617,976 B2* | 4/2017 | Edenfeld | F03D 9/25 |
| 9,680,306 B2* | 6/2017 | Xue | H02J 3/386 |
| 9,859,710 B2* | 1/2018 | Garcia | F03D 7/048 |
| 9,866,160 B2* | 1/2018 | Tan | H02P 9/007 |
| 10,352,298 B2* | 7/2019 | Tan | F03D 7/0276 |
| 10,581,247 B1* | 3/2020 | Kolhatkar | H02J 3/386 |
| 2002/0079706 A1* | 6/2002 | Rebsdorf | H02P 9/007 290/55 |
| 2004/0026929 A1* | 2/2004 | Rebsdorf | H02P 9/007 290/44 |
| 2006/0113800 A1* | 6/2006 | Willisch | H02P 9/007 290/44 |
| 2007/0177314 A1* | 8/2007 | Weng | H02P 9/007 361/20 |
| 2008/0093855 A1 | 4/2008 | Walling | |
| 2008/0150285 A1* | 6/2008 | Corcelles Pereira | H02J 3/1807 290/44 |
| 2009/0206606 A1* | 8/2009 | Jorgensen | F03D 7/0224 290/44 |
| 2009/0267572 A1* | 10/2009 | Engelhardt | H02P 9/007 322/61 |
| 2009/0278354 A1* | 11/2009 | Ichinose | H02P 9/007 290/44 |
| 2010/0133831 A1* | 6/2010 | Scholte-Wassink | F03D 7/0292 290/44 |
| 2010/0256829 A1* | 10/2010 | Alonso Sadaba | F03D 7/0272 700/287 |
| 2010/0320762 A1* | 12/2010 | Letas | H02J 3/18 290/44 |
| 2011/0018270 A1* | 1/2011 | Corcelles Pereira | H02J 3/1807 290/44 |
| 2011/0074152 A1* | 3/2011 | Yasugi | F03D 7/0284 290/44 |
| 2011/0187103 A1* | 8/2011 | Yasuga | H02P 9/007 290/44 |
| 2011/0291414 A1* | 12/2011 | Arinaga | F03D 7/0224 290/44 |
| 2011/0309875 A1* | 12/2011 | Wei | H02M 1/32 327/482 |
| 2012/0056602 A1* | 3/2012 | Li | H02P 9/48 322/89 |
| 2012/0101640 A1* | 4/2012 | Stapelfeldt | F03D 7/0284 700/287 |
| 2013/0057227 A1* | 3/2013 | Aurtenetxea | H02H 7/06 322/28 |
| 2013/0170254 A1* | 7/2013 | Letas | H02J 3/1892 363/34 |
| 2013/0221934 A1* | 8/2013 | Wakasa | H02J 3/386 322/20 |
| 2015/0263521 A1* | 9/2015 | Garcia | F03D 7/048 307/52 |
| 2015/0311696 A1* | 10/2015 | Zhu | H02H 7/06 361/21 |
| 2015/0365031 A1* | 12/2015 | Wessels | H02J 3/1885 290/44 |
| 2016/0177923 A1* | 6/2016 | Edenfeld | F03D 9/25 290/44 |
| 2016/0197559 A1* | 7/2016 | Tan | H02P 9/007 363/35 |
| 2016/0285399 A1* | 9/2016 | Wang | H02P 9/007 |
| 2016/0369776 A1* | 12/2016 | Edenfeld | F03D 9/25 |
| 2018/0171976 A1* | 6/2018 | Tan | F03D 7/0272 |
| 2019/0234378 A1* | 8/2019 | Tan | H02J 3/50 |
| 2019/0280640 A1* | 9/2019 | Ganireddy | H02S 10/12 |
| 2020/0076193 A1* | 3/2020 | Biris | F03D 9/255 |

* cited by examiner

WIND POWER GENERATION SYSTEM AND CONTROLLING METHOD THEREOF

BACKGROUND OF THE INVENTION

With increasing shortage of global energy resources and increasing environmental pollution, clean and renewable energy resources, especially wind energy sources, have been rapidly developing. Wind turbines have gained attention in this regard.

It is known that the operation of a wind turbine depends on the wind speed. For example, wind turbines have predetermined wind speed threshold values for determining operational conditions of a wind generation system. One such threshold value is a cut-in wind speed that is defined as the wind speed when the wind generation system starts to generate power. Another threshold value is a cut-out wind speed which is defined as the highest wind speed when the wind turbine may be operated while delivering power. Normally, generating power will be stopped at wind speeds higher than the cut-out wind speed.

Based on IEC (International Electro-technical Commission) standard, the wind zone is divided into four classes: class I (in which the average wind speed is in the range of 8.5 m/s to 10 m/s), class II (in which the average wind speed is in the range of 7.5 m/s to 8.5 m/s), class III (in which the average wind speed is in the range of 6.0 m/s to 7.5 m/s) and class IV (in which the average wind speed is lower than 6.0 m/s). In the past, most technical developments have been in the medium and high wind.

BRIEF DESCRIPTION OF THE INVENTION

In one embodiment, the present disclosure provides a wind power generation system, which comprises a wind turbine for generating mechanical energy; a generator for converting the mechanical energy into electrical energy; a converter for converting the electrical energy to expected power for supplying to a grid, wherein a rotor of the generator is connected to converter, an output of a stator of the generator and an output of a converter are both connected to the grid; a controller for controlling the converter to absorb rotor-side reactive power and to increase line-side reactive power, so as to meet a reactive power demand of the grid, when a rotor speed is less than a predetermined value.

In another embodiment, the present disclosure provides a method of controlling a wind power generation system, the system comprising a wind turbine for generating mechanical energy; a generator for converting the mechanical energy into electrical energy; a converter for converting the electrical energy to expected power for supplying to a grid, wherein the rotor of the generator is connected to converter, an output of the stator of the generator and an output of a converter are both connected to the grid, wherein the method comprises controlling the converter to absorb rotor-side reactive power and to increase line-side reactive power, so as to meet a reactive power demand of the grid, when a rotor speed is less than a predetermined value.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Embodiments of the present disclosure will be described herein below with reference to the accompanying drawings. In the following description, well-known functions or constructions are not described in detail to avoid obscuring the disclosure in unnecessary detail.

Unless defined otherwise, technical and scientific terms used herein have the same meaning as is commonly understood by one of ordinary skill in the art to which this disclosure belongs. The terms "a" and "an" do not denote a limitation of quantity, but rather denote the presence of at least one of the referenced items. The term "or" is meant to be inclusive and mean either or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect.

Embodiments of the invention may be described herein in terms of functional components and various processing steps. It should be appreciated that such functional components may be realized by any number of hardware, software, and/or firmware components configured to perform the specific functions. For example, an embodiment of the invention may employ various integrated circuit components, e.g., memory elements, digital signal processing elements, logic elements, look-up tables, or the like, which may carry out a variety of functions of "controller" under the control of one or more microprocessors or other control devices. Moreover, the system described herein merely illustrates one exemplary embodiment.

Figure 1:
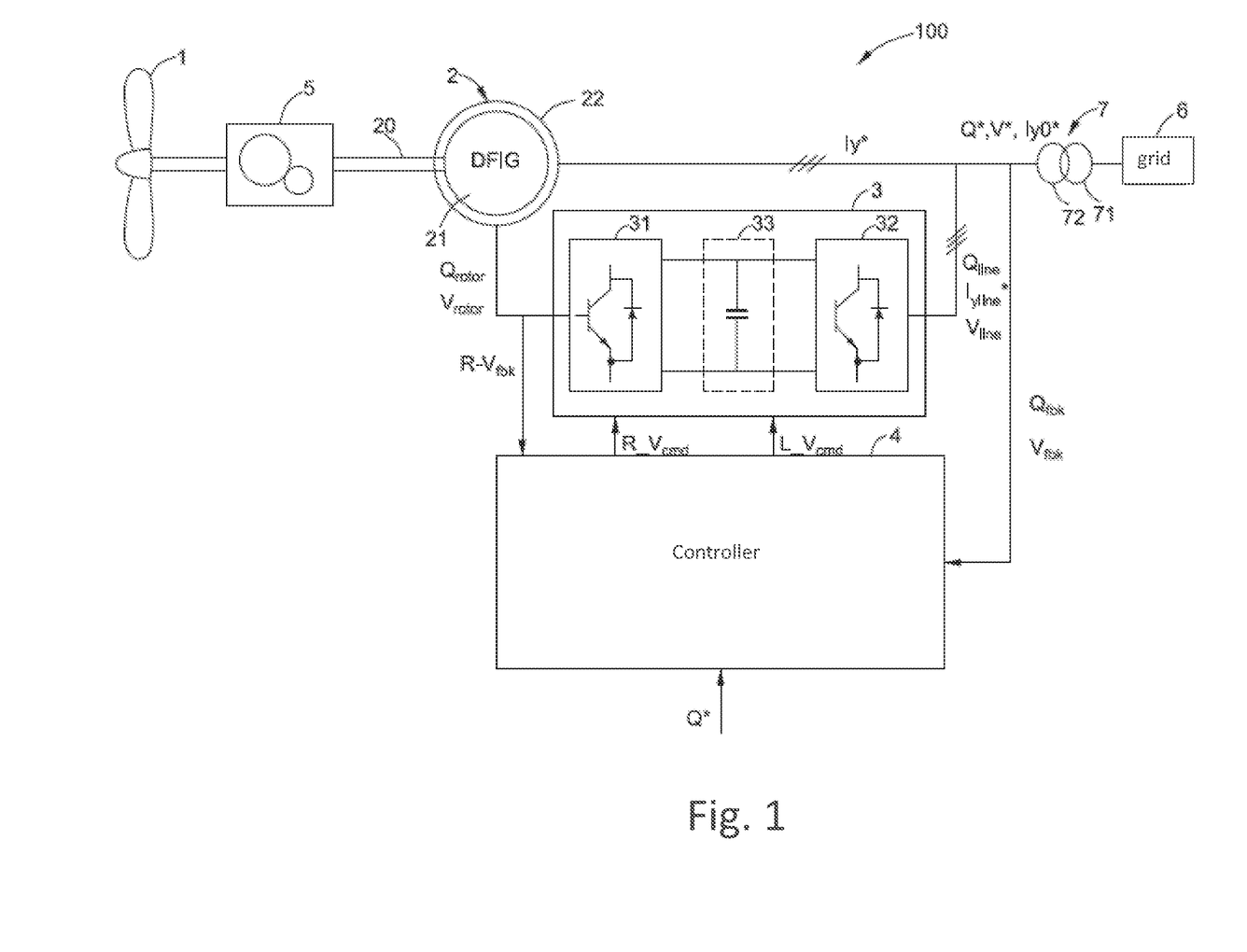
FIG. 1 is a schematic diagram of an exemplary wind generation system in accordance with an embodiment of the present disclosure.

FIG. 1 illustrates a schematic diagram of an exemplary wind generation system in accordance with an embodiment of the present disclosure. As shown in FIG. 1, the exemplary wind generation system 100 may comprise a wind turbine 1, a doubly-fed induction generator (DFIG) 2, a converter 3 and a controller 4. The wind turbine 1 receives wind energy and generates mechanical power. In some embodiments, the wind generation system 100 may further include a gearbox 5 between the wind turbine 1 and the DFIG 2. The gearbox 5 may transmit the mechanical power into a more suitable mechanical force to drive a rotor shaft 20.

The DFIG 2 may convert the mechanical power into electrical power and includes a rotor 21 and a stator 22. The rotor 21 of the DFIG 2 may be coupled to the rotor shaft 20 and may be rotated by the mechanical force via the rotor shaft 20. The stator 22 of the DFIG 2 may be magnetically coupled to the rotor 21 and may be coupled to a power grid 6 through a transformer 7.

The converter 3 is configured to convert the electrical power to a desired electrical power for supplying to the power grid 6, and may include a rotor-side converter 31, a line-side converter 32 and a DC (Direct Current) link 33 for connecting the rotor-side converter 31 and the line-side converter 32. The rotor-side converter 31 may include an AC-DC converter and is configured to convert an AC (Alternating Current) voltage from the rotor 21 of the DFIG 2 into a DC link voltage on the DC link 33. The DC link 33 may include one or more capacitors coupled either in series or in parallel for maintaining the DC link voltage at a certain level, and thus the electrical power from the DC link 33 to the power grid 6 can be managed. The line-side converter 32 may include a DC-AC inverter and is configured to convert the DC link voltage on the DC link 33 to an AC voltage with suitable frequency, phase, and magnitude for feeding to the power grid 6.

The transformer 7 is configured to provide voltage or current transformation of the power from the converter 3 and the power from the stator 22 of the DFIG 2 and provide isolation between the converter 3 and the power grid 6 and between the DFIG 2 and the power grid 6. The transformer 7 is configured to step up the magnitude of the AC voltages output from the line-side converter 31 and the stator 22 of the DFIG 2 to match the power grid 6. The transformer 7 may include a primary winding 71 connected to the power grid 6 and a secondary winding 72 connecting with the stator 22 and the line-side converter 32. In an optional embodiment, the transformer 7 may be an on-load tap-changing transformer. A turn ratio of the on-load tap-changing transformer 7, which is defined as a turn ratio of the primary winding 71 to the secondary winding 72, may be changed.

Cut-in speed means the lowest wind speed to enable the wind power generation system to begin to generate power, which means that the wind speed should higher than the cut-in speed. When the wind power generation system is operating within the low wind speed area, the wind power generation system may not able to work for a long time. When the wind speed is lower than the cut-in speed, the wind power generation system will be shut down. The repeated start process of the wind power generation system will take a long time.

In order to capture wind power in low wind speed area, two key factors are to be considered. The first is to lower the cut-in speed, and the second is to optimize the tip speed ratio for low wind speed, such as 3~5 m/s. Both factors require the electrical system (DFIG+Converter) to work at a higher slip ratio area.

$$V_{rotor} = S * N * V_{stator}$$

In the above formula, Vrotor indicates rotor-side voltage, S indicates slip ratio, N indicates turn ratio of rotor and stator, which is normally unchanged. According to the formula, under current control system, high slip ratio will result in the rising of the rotor-side voltage, which will become beyond the limit, so that the wind power generation system cannot work normally.

Please refer to FIG. 1, from the technique of the present application, for low wind speed, such as the rotating speed of the rotor is lower than the predetermined value, e.g. 1000 RPM, and the grid-side reactive power is a predetermined value Q*, the controller 4 controls the converter to absorb the rotor-side reactive power Qrotor, and controls to increase the line-side reactive power Qline, so as to meet the grid-side reactive power target value Q*. The rotor-side reactive power is lowered, the Vrotor is lowered to avoid Vrotor becoming beyond the voltage limit. Meanwhile, for low rotating speed of rotor, the tip speed ratio can be close to the optimal value, and for high rotating speed of rotor, the tip speed ratio should be raised due to the relationship of the rotating speed of rotor and the voltage on rotor side. For low rotating speed of rotor, the active power is low, and extra reactive power demand on line-side is low, so that the extra loss of the converter on line-side is minor.

For high wind speed, such as the rotating speed of the rotor is higher than or equal to the predetermined value, e.g. 1000 RPM, and the controller of the wind power generation system can work normally under existing control mode. Unless reactive power demand goes beyond the converter capability on rotor side, no reactive power is required on line side. In this case, the reactive power and active power can be input to the grid normally.

The wind power generation system 100 according to the embodiment of the application can lower Vrotor within limit, so that the cut-in rotating speed $\omega_{cutin}$ of rotor 21 of DFIG 2 can be lowered to capture more wind power at low wind speed. This not only will start wind turbine 1 earlier but also can decrease a dead zone between the shut down and restart of the wind turbine 1 due to high turbulence for low wind speed. Therefore, the loss of the annual electricity production (AEP) can be reduced. The benefit of this application is more significant when average wind speed is below 7 m/s. When the average wind speed is between 5.5 m/s and 6.5 m/s, the AEP can increase 0.28~0.46%.

Figure 2:
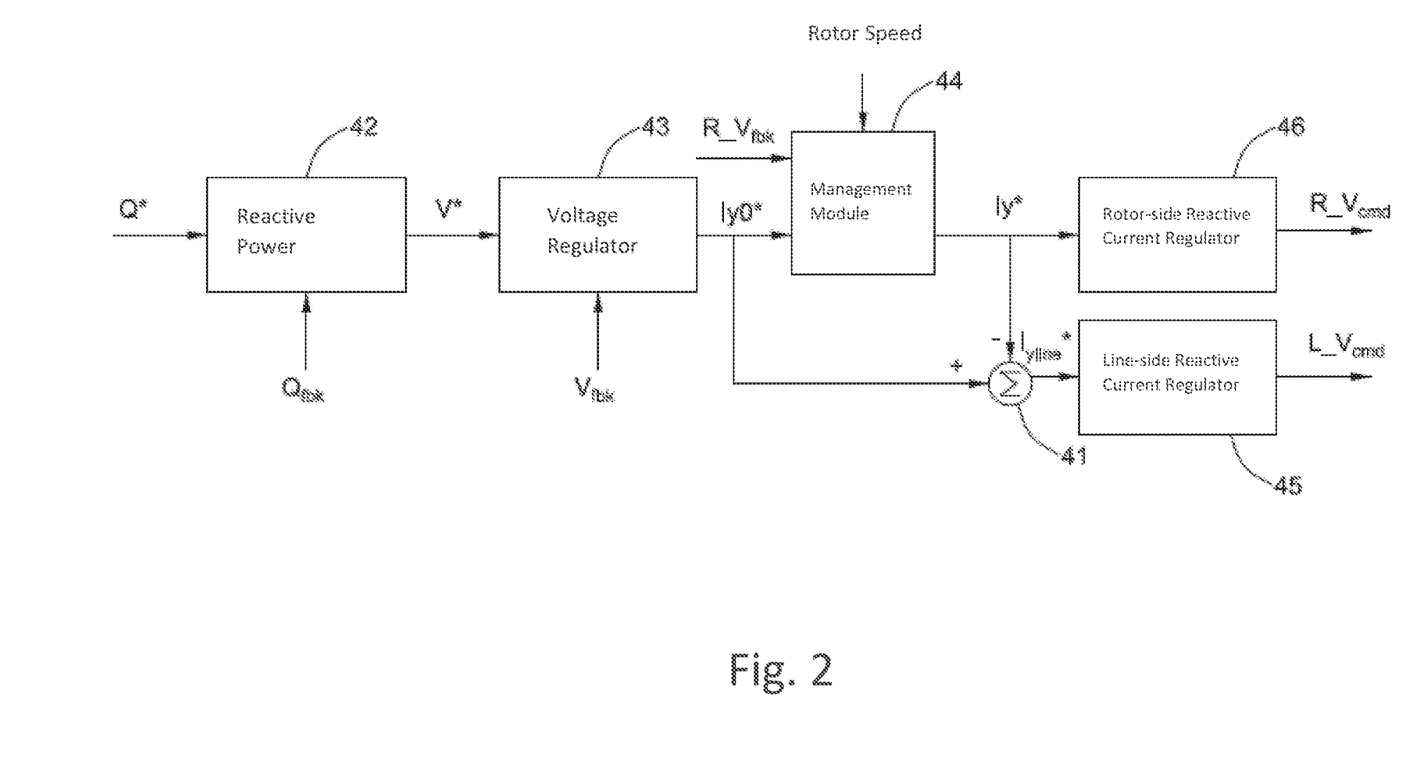
FIG. 2 is a schematic diagram of a controller in accordance with an embodiment of the present disclosure.

As shown in FIG. 2, the controller 4 includes a reactive power regulator 42, a voltage regulator 43, a management module 44 and a reactive current adder 41. Wherein the reactive power regulator 42 obtains the grid-side target voltage V* according to the grid-side reactive power target value Q* and the grid-side reactive power feedback value Qfbk. The voltage regulator 43 obtains grid-side target reactive current Iy0* according to the grid-side voltage feedback value Vfbk and the grid-side target voltage V*.

When the rotating speed of rotor is lower than the predetermined value, such as 1000 RPM, the management module 44 of the controller 4 obtains the stator-side target reactive current Iy* according to the rotor-side maximum withstand voltage value Vrotor-max, the rotor voltage R-Vfbk and the grid-side target reactive current Iy0*.

$$I_{y0}* = I_{yline}*$$

The grid-side reactive current predetermined value Iy0* is the addition of the stator-side target reactive current Iy* and the line-side target reactive current Iyline*. Input the grid-side reactive current predetermined value Iy0* and the stator-side target reactive current Iy* to the reactive current adder 41, the line-side target reactive current Iyline* can be obtained, and then responding control signal can be obtained to control line-side reactive current to reach Iyline*, so as to make the rotor-side voltage lower than the maximum withstand voltage value Vrotor-max, and to enable the wind generation system to work properly.

When the rotating speed of rotor is no less than the predetermined value, such as 1000 RPM, the controller 4 directly sets Iy0*=Iy*, that is Iyline*=0. There is no reactive power on the line side.

Figure 3:
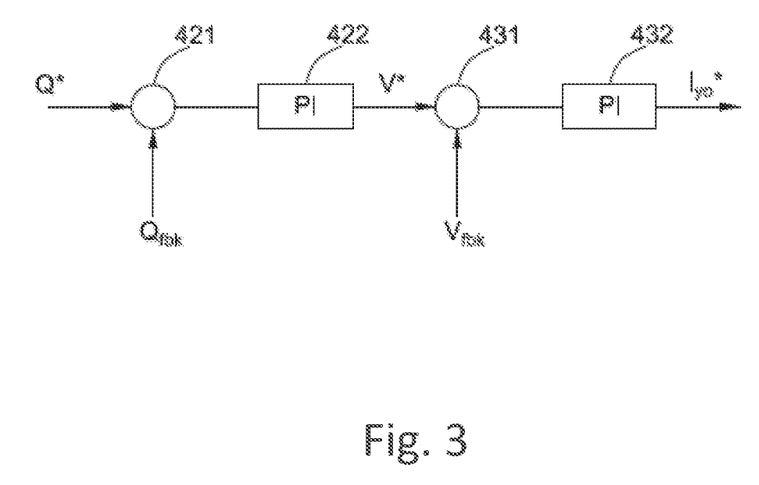
FIG. 3 is a schematic diagram of a reactive power regulator and a voltage regulator of a controller in accordance with an embodiment of the present disclosure.

As shown in FIG. 3, in an example, the reactive power regulator 42 includes a reactive power adder 421 and a proportional integrator 422. The grid-side reactive power target value Q* and the grid-side reactive power feedback value Qfbk are operated by the reactive power adder 421, and then the operated signal is operated by the proportional integrator 422 to obtain the grid-side target voltage V*. The voltage regulator 43 includes a voltage adder 431 and a proportional integrator 432. The grid-side target voltage V* and the grid-side voltage feedback value Vfbk are operated by the voltage adder 431. The operated signal is inputted into the proportional integrator 432 to obtain the grid-side target reactive current Iy0*. In other examples, the reactive power regulator 42 and voltage regulator 43 can be replaced by other structures that can achieve same objects.

Figure 4:
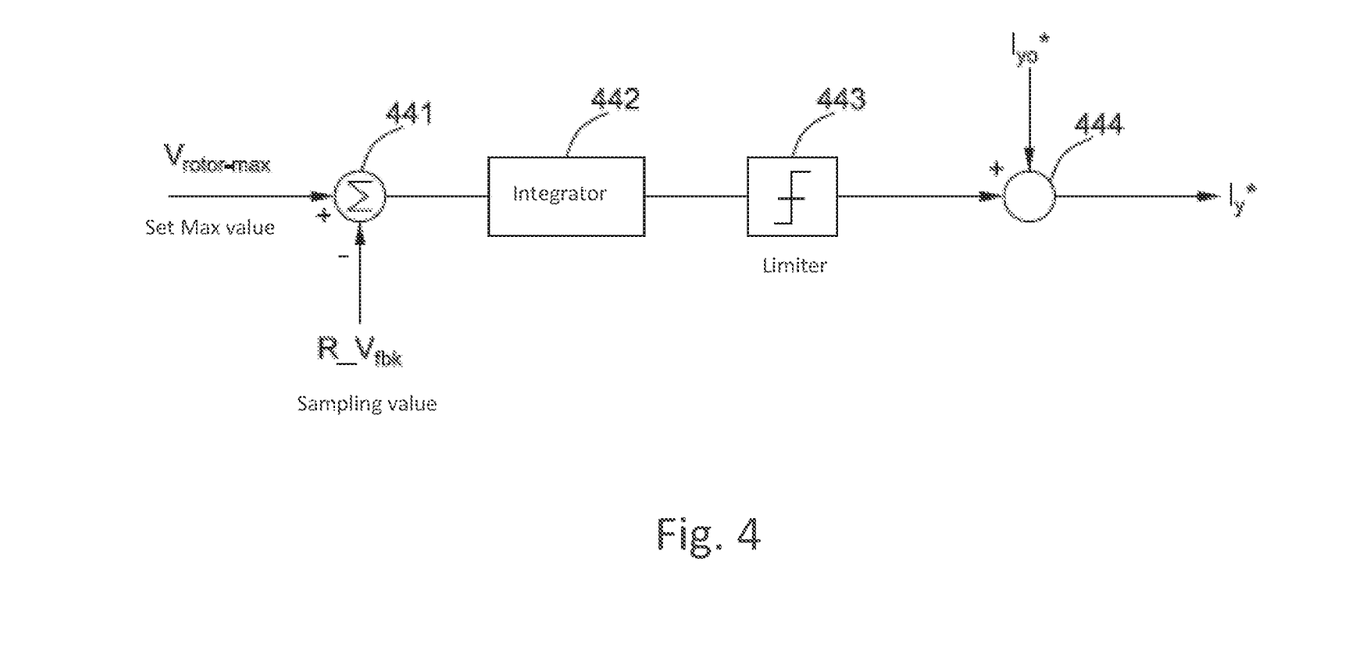
FIG. 4 is a schematic diagram of a management module of a controller in accordance with an embodiment of the present disclosure.

Please refer to FIG. 4, determine first whether the rotating speed of rotor is less than the predetermined value. When the rotating speed of rotor is less than the predetermined value, such as 1000 RPM, a signal is inputted into the management module 44, and the management module works normally; when the rotating speed of rotor is no less than the predetermined value, such as 1000 RPM, the management module 44 will not be used, and then Iy0*=Iy*.

In a detailed example, the management module 44 includes the rotor side adder 441, an integrator 442, a limiter 443 and an arithmetic unit 444 connected in turn. The input of the rotor side adder 441 is the rotor-side maximum withstand voltage value Vrotor-max voltage and rotor voltage sampling value R_Vfbk. The rotor side adder sends operated signal into the integrator 442, the limiter 443, and the arithmetic unit 444 inputted with the grid-side target reactive current Iy0*, so as to obtain the stator-side target reactive current Iy*. In other examples, the management module 44 can be replaced by other structures that can achieve same objects.

Further refer to FIG. 2, the controller 4 includes the reactive current adder 41 to calculate difference between the predetermined value of the reactive current Iy0* and the stator-side target reactive current Iy*, which is the line-side target reactive current Iyline*.

Wherein the controller 4 further includes a rotor-side reactive current regulator 46 for receiving the stator-side target reactive current Iy* so as to obtain the rotor-side voltage control signal R_Vcmd; and the line-side reactive current regulator 45 for receiving the line-side target reactive current Iyline*, so as to obtain the line-side voltage control value L_Vcmd.

When the rotating speed of rotor is less than the predetermined value, the controller 4 controls the rotor side voltage and line side voltage according to the rotor side voltage control value R_Vcmd and line side voltage control value L_Vcmd respectively. Therefore, when the rotating speed of rotor is less than the predetermined value, the reactive power inputted in to the grid can achieve the predetermined value, and the rotor side voltage will not exceed the safe working limit.

Figure 5:
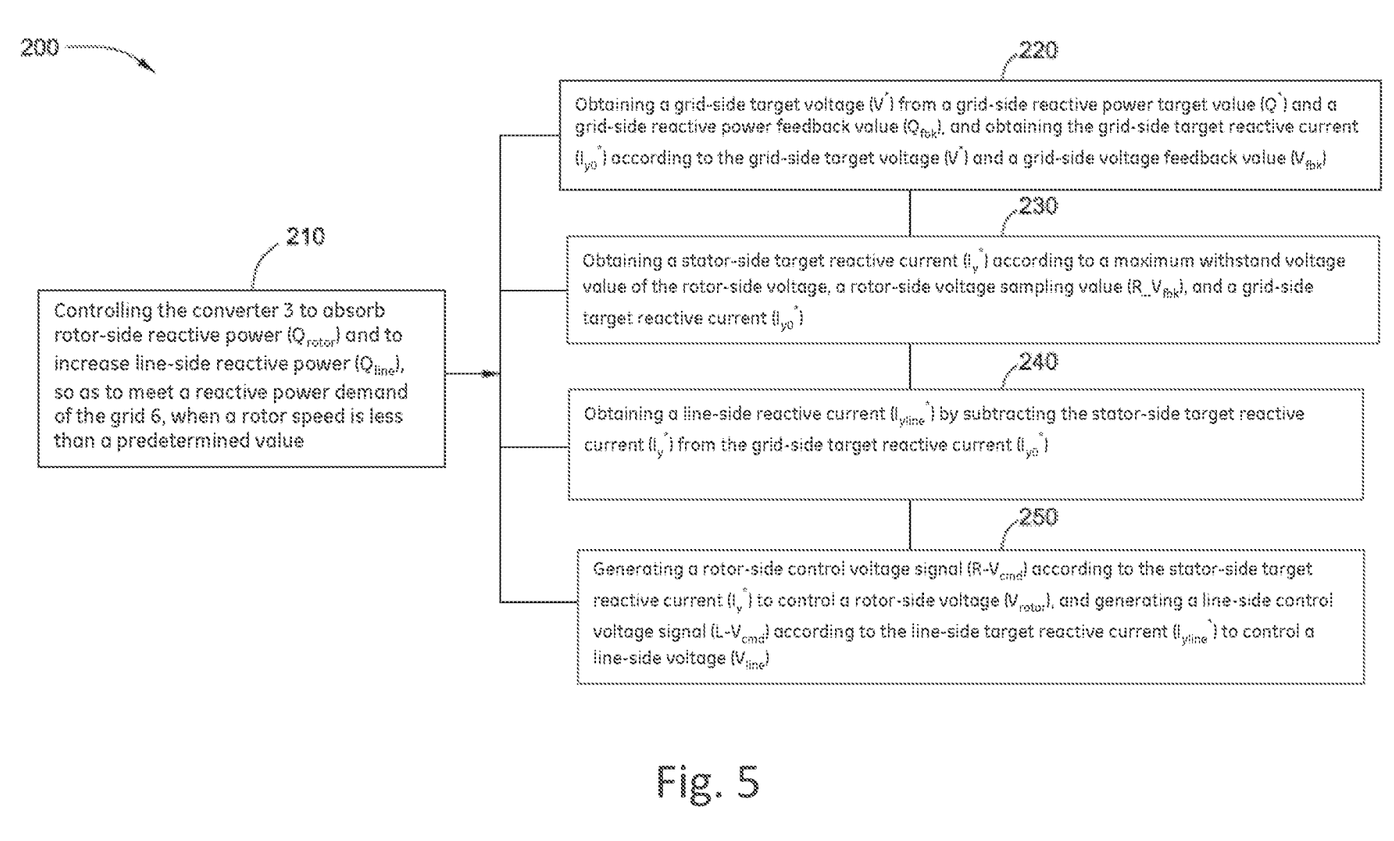
FIG. 5 is a flow chart of an exemplary method for controlling a wind generation system in accordance with an embodiment of the present disclosure.

An embodiment of this application also provides a method of controlling a wind power generation system 100. The wind power generation system 100 is illustrated as above. FIG. 5 illustrates a flow chart of an exemplary method for controlling a wind generation system 100. A method 200 of controlling a wind power generation system 100 includes 210) controlling the converter to absorb rotor-side reactive power Qrotor and to increase line-side reactive power Qline, so as to meet a reactive power demand Q* of the grid, when a rotor speed is less than a predetermined value, such as 1000 RPM. When the reactive power on rotor side is lowered, the Vrotor is lowered to avoid Vrotor becoming beyond the voltage limit. Meanwhile, for low rotating speed of rotor, the tip speed ratio can be close to the optimal value, and for high rotating speed of rotor, the tip speed ratio should be raised due to the relationship of the rotating speed of rotor and the voltage on rotor side. For low rotating speed of rotor, the active power is low, and extra reactive power demand on line side is low, so that the extra loss of the converter on line side is minor.

For high wind speed, when the rotating speed of the rotor is higher than or equal to the predetermined value, such as 1000 RPM, and the controller of the wind power generation system can work normally under existing control mode. Unless reactive power demand goes beyond the converter capability on rotor side, no reactive power is required on line side. In this case, the reactive power and active power can be input to the grid normally.

The step of 210) controlling the converter to absorb rotor-side reactive power Qrotor and to increase line-side reactive power Qline when a rotor speed is less than a predetermined value includes a step of 220) obtaining a grid-side target voltage (V*) according to a grid-side reactive power target value (Q*) and a grid-side reactive power feedback value (Qfbk), and obtaining the grid-side target reactive current (Iy0*) according to a grid-side target voltage (V*) and a grid-side voltage feedback value (Vfbk).

As shown in FIG. 3, in an example, the grid-side reactive power target value Q* and the grid-side reactive power feedback value Qfbk are operated by the adder 421, the operated signal is then inputted into a regulator, such as a proportional integrator 422 to obtain the grid-side target voltage V*. The grid-side target voltage V* and the grid-side voltage feedback value Vfbk are operated by the adder 431. The operated signal is then inputted into a regulator, such as a proportional integrator 432 to obtain the grid-side target reactive current Iy0*.

The step of 210) controlling the converter to absorb rotor-side reactive power Qrotor and to increase line-side reactive power Qline when a rotor speed is less than a predetermined value includes a step of 230) obtaining a stator-side target reactive current Iy* according to a maximum withstand voltage value Vrotor-max of the rotor-side voltage, a rotor-side voltage sampling value R_Vfbk, and a grid-side target reactive current Iy0*.

When the rotating speed of rotor is less than the predetermined value, such as 1000 RPM, the maximum withstand voltage limit Vrotor-max of the rotor-side voltage and rotor-side voltage sampling value R-Vfbk was processed via an adder, an integrator, and a limiter. The obtained value and the grid-side target reactive current Iy0* are operated in an arithmetic unit to obtain the stator-side target reactive current Iy*.

The step of 210) controlling the converter to absorb rotor-side reactive power Qrotor and to increase line-side reactive power Qline when a rotor speed is less than a predetermined value includes a step of 240) obtaining a line-side reactive current Iyline* according to the stator-side target reactive current Iy* and the grid-side target reactive current Iy0*.

Due to Iy0*=Iy*+Iyline*, the stator-side target reactive current Iy* and the grid-side target reactive current have a subtract operation via the arithmetic unit 444 to obtain the line side reactive current Iy0*.

The step of 210) controlling the converter to absorb rotor-side reactive power Qrotor and to increase line-side reactive power Qline when a rotor speed is less than a predetermined value includes a step of 250) generating a rotor-side control voltage signal R-Vcmd according to the stator-side target reactive current Iy* to control a rotor-side voltage Vrotor, and generating a line-side control voltage signal L-Vcmd according to the line-side target reactive current Iyline* to control a line-side voltage Vline. The rotor-side voltage control signal R_Vcmd is generated according to the rotor-side reactive current regulator 46 and the stator-side target reactive current Iy*; the line-side voltage control signal L_Vcmd is generated according to the line-side reactive current regulator 45 and line-side target reactive current Iyline*.

When the rotating speed of rotor is less than the predetermined value, the controller 4 controls the rotor side voltage and line side voltage according to the rotor side voltage control value R_Vcmd and line side voltage control value L_Vcmd respectively. Therefore, when the rotating speed of rotor is less than the predetermined value, the reactive power inputted in to the grid can achieve the predetermined value, and the rotor side voltage will not exceed the safe working limit.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A wind power generation system, comprising:
   a wind turbine for generating mechanical energy;
   a generator for converting the mechanical energy into electrical energy, the generator comprising a rotor and a stator;
   a converter assembly connected between the rotor of the generator and a grid, the converter assembly comprising a rotor-side converter and a line-side converter, an output of the stator of the generator and an output of the converter both being connected to the grid; and
   a controller for controlling the converter to absorb rotor-side reactive power and to increase line-side reactive power so as to meet a reactive power demand of the grid when a rotor speed is less than a predetermined value.

2. The wind power generation system of claim 1, wherein the controller comprises a management module configured to obtain a stator-side target reactive current according to a maximum withstand voltage value of a rotor-side voltage, a rotor-side voltage sampling value, and a grid-side target reactive current, when the rotor speed is less than the predetermined value, wherein the controller manages the rotor-side reactive power and the line-side reactive power according to the stator-side target reactive current.

3. The wind power generation system of claim 2, wherein the management module comprises a rotor-side adder, an integrator, a limiter and an arithmetic unit connected in turn, wherein the maximum withstand voltage value of the rotor side voltage and the rotor side voltage sampling value are processed by the rotor-side adder, the integrator, the limiter to produce a result, the result and the grid-side target reactive current being processed by the arithmetic unit to obtain the stator-side target reactive current.

4. The wind power generation system of claim 2, wherein the controller comprises a reactive power regulator and a voltage regulator, wherein the reactive power regulator obtains a grid-side target voltage from a grid-side reactive power target value and a grid-side reactive power feedback value, and inputs the grid-side target voltage to the voltage regulator, wherein the voltage regulator obtains the grid-side target reactive current according to the grid-side target voltage and a grid-side voltage feedback value.

5. The wind power generation system of claim 2, wherein the controller comprises a reactive current adder configured to subtract the stator-side target reactive current from the grid-side target reactive current to obtain a line-side reactive current.

6. The wind power generation system of claim 5, wherein the controller comprises a rotor-side reactive current regulator that generates a rotor-side control voltage signal according to the stator-side target reactive current to control a rotor-side voltage, and a line-side reactive current regulator that generates a line-side control voltage signal according to the line-side target reactive current to control a line-side voltage.

7. The wind power generation system of claim 1, wherein the rotor speed is less than a predetermined value when an average wind speed is below 7 meters/second (m/s).

8. The wind power generation system of claim 7, wherein the average wind speed is at least 5.5 m/s and is less than or equal to 6.5 m/s.

9. The wind power generation system of claim 1, wherein the predetermined value is 1000 revolutions per minute (RPM).

10. A method of controlling a wind power generation system, the system having a wind turbine for generating mechanical energy, the wind turbine having a generator for converting the mechanical energy into electrical energy and a converter connected between the generator and a grid, the method comprising:
   determining that a rotor speed is less than a predetermined value;
   obtaining a stator-side target reactive current according to a maximum withstand voltage value of a rotor-side voltage;
   obtaining a rotor-side voltage sampling value;
   obtaining a grid-side target reactive current;
   obtaining a line-side reactive current according to the stator-side target reactive current and the grid-side target reactive current
   generating a rotor-side control voltage signal according to the stator-side target reactive current to control a rotor-side voltage and generating a line-side control voltage signal according to the line-side target reactive current to control a line-side voltage to control the converter to absorb rotor-side reactive power and to increase line-side reactive power, so as to meet a reactive power demand of the grid.

11. The method of claim 10, wherein controlling the converter to absorb rotor-side reactive power and to increase line-side reactive power further comprises obtaining a grid-side target voltage according to a grid-side reactive power target value and a grid-side reactive power feedback value and obtaining the grid-side target reactive current according to the grid-side target voltage and a grid-side voltage feedback value.

12. The method of claim 10, further comprising:
processing, via a rotor-side adder, the maximum withstand voltage value of the rotor side voltage and the rotor side voltage sampling value to develop an operated signal;
processing, via an integrator and a limiter, the operated signal to produce a result; and
processing, via an arithmetic unit, the result and the grid-side target reactive current to obtain the stator-side target reactive current.

13. The method of claim 10, further comprising:
obtaining a grid-side target voltage from a grid-side reactive power target value;
inputting the grid-side target voltage to a voltage regulator; and
wherein obtaining the grid-side target reactive current comprises obtaining, via the voltage regulator, the grid-side target reactive current according to the grid-side target voltage and a grid-side voltage feedback value.

14. The method of claim 10, further comprising:
subtracting, via a reactive current adder, the stator-side target reactive current from the grid-side target reactive current to obtain the line-side reactive current.

15. The method of claim 10, wherein the rotor speed is less than a predetermined value when an average wind speed is below 7 m/s.

16. The method of claim 15, wherein the average wind speed is at least 5.5 m/s and is less than or equal to 6.5 m/s.

17. The method of claim 10, wherein the predetermined value of the rotor speed is 1000 RPM.

* * * * *